US011200489B2

(12) United States Patent
Cohen et al.

(10) Patent No.: US 11,200,489 B2
(45) Date of Patent: Dec. 14, 2021

(54) CONTROLLER TRAINING BASED ON HISTORICAL DATA

(71) Applicant: IMUBIT ISRAEL LTD., Kibbutz Kiryat Anavim (IL)

(72) Inventors: Nadav Cohen, Yavne (IL); Gilad Cohen, Houston, TX (US)

(73) Assignee: IMUBIT ISRAEL LTD., Kiryat Anavim (IL)

( * ) Notice: Subject to any disclaimer, the term of this patent is extended or adjusted under 35 U.S.C. 154(b) by 962 days.

(21) Appl. No.: 15/883,114

(22) Filed: Jan. 30, 2018

(65) Prior Publication Data

US 2019/0236447 A1  Aug. 1, 2019

(51) Int. Cl.
*G06N 3/08* (2006.01)
*G06N 5/02* (2006.01)

(52) U.S. Cl.
CPC ................. *G06N 3/08* (2013.01); *G06N 5/02* (2013.01)

(58) Field of Classification Search
CPC .................................. G06N 3/08; G06N 5/02
USPC .......................................................... 706/25
See application file for complete search history.

(56) References Cited

U.S. PATENT DOCUMENTS

| 5,311,421 | A | | 5/1994 | Nomura et al. |
| 5,498,943 | A | | 3/1996 | Kimoto et al. |
| 5,825,646 | A | * | 10/1998 | Keeler ............... G05B 13/0285 |
| | | | | 700/44 |
| 6,185,470 | B1 | | 2/2001 | Pado et al. |
| 6,882,992 | B1 | | 4/2005 | Werbos |
| 8,296,107 | B2 | | 10/2012 | Turner et al. |
| 8,639,637 | B2 | | 1/2014 | Cruz et al. |
| 9,690,312 | B2 | * | 6/2017 | Steven .................... G06Q 10/04 |
| 10,926,408 | B1 | * | 2/2021 | Vogelsong ............. B25J 9/1671 |
| 2002/0059202 | A1 | * | 5/2002 | Hadzikadic .......... G06K 9/6282 |
| 2003/0108244 | A1 | * | 6/2003 | Li ...................... G06K 9/00228 |
| | | | | 382/227 |
| 2007/0156288 | A1 | * | 7/2007 | Wroblewski ......... G05B 13/042 |
| | | | | 700/266 |
| 2007/0168328 | A1 | * | 7/2007 | Peralta ..................... G06N 3/02 |

(Continued)

FOREIGN PATENT DOCUMENTS

EP        0545379 A1     6/1993

OTHER PUBLICATIONS

Nguyen et al., "Multiple neural networks for a long term time series forecast", Neural Computing & Applic (2004) 13:90-98 (Year: 2004).*

(Continued)

*Primary Examiner* — Tsu-Chang Lee
(74) *Attorney, Agent, or Firm* — Kligler & Associates Patent Attorneys Ltd

(57) ABSTRACT

A method of generating a controller for a continuous process. The method includes receiving from a storage memory, off-line stored values of one or more controlled variables and one or more manipulated variables of the continuous process over a plurality of time points. The off-line stored values are used to train a first neural network to operate as a predictor of the controlled variables. Then, the method includes training a second neural network to operate as a controller of the continuous process using the first neural network after it was trained to operate as the predictor for the continuous process and employing the second neural network as a controller of the continuous process.

28 Claims, 4 Drawing Sheets

(56) References Cited

U.S. PATENT DOCUMENTS

| | | | |
|---|---|---|---|
| 2010/0050025 A1* | 2/2010 | Grichnik | G05B 17/02 |
| | | | 714/47.2 |
| 2012/0053762 A1* | 3/2012 | Stiefenhofer | B64C 13/507 |
| | | | 701/3 |
| 2015/0094850 A1 | 4/2015 | Passot et al. | |
| 2015/0379429 A1* | 12/2015 | Lee | G06N 20/00 |
| | | | 706/11 |
| 2016/0154388 A1 | 6/2016 | Gao et al. | |
| 2017/0060107 A1 | 3/2017 | Hellmundt et al. | |
| 2017/0139423 A1 | 5/2017 | El Ferk et al. | |
| 2017/0179716 A1 | 6/2017 | Vitullo et al. | |
| 2020/0074486 A1* | 3/2020 | Motohashi | G06Q 30/0202 |

OTHER PUBLICATIONS

Wang et al., "A Combined Adaptive Neural Network and Nonlinear Model Predictive Control for Multirate Networked Industrial Process Control", IEEE Trans. On Neural Networks and Learning Systems, vol. 27, No. 2, Feb. 2016 (Year: 2016).*

Doroudi et al., "Robust Evaluation Matrix Towards a More Principled Offline Exploration of Instructional Policies", Annual ACM Conference on Learning @ Scale, 10 Pages, Apr. 20-21, 2017.

Fonteneau et al, "Model-Free Monte Carlo—like Policy Evaluation", Proceedings of the 13th International Conference on Artificial Intelligence and Statistics (AISTATS), pp. 217-224, 2010.

Mandel et al., "Offline Evaluation of Online Reinforcement Learning Algorithms", Proceedings of the Thirtieth AAAI Conference on Artificial Intelligence, Phoenix, USA, 16 pages, Feb. 12-17, 2016.

Mandel et al., "Offline Policy Evaluation Across Representations with Applications to Educational Games", Proceedings of the 13th International Conference on Autonomous Agents and Multiagent Systems (AAMAS 2014), 10 pages, May 5-9, 2014.

Thomas et al., "High Confidence Off-Policy Evaluation", Proceedings of the Twenty-Ninth AAAI Conference on Artificial Intelligence, Austin, US, pp. 3000-3006 , Jan. 25-30, 2015.

Thomas et al., "Data-Efficient Off-Policy Policy Evaluation for Reinforcement Learning", Proceedings of the 33rd International Conference on International Conference on Machine Learning , vol. 48, New York, US, 37 pages, Jun. 19-24, 2016.

Goodfellow et al., "Deep Learning", MIT Press, 787 pages, 2016.

Gruslys et al., "The Reactor: A Sample-Efficient Actor-Critic Architecture", downloaded from https://arxiv.org/pdf/1704.04651.pdf, 12 pages, Apr. 15, 2017.

Munos et al., "Safe and efficient off-policy reinforcement learning", downloaded from https://arxiv.org/pdf/1606.02647.pdf, 18 pages, Nov. 7, 2016.

International Application # PCT/IB2018/059089 search report dated Jan. 9, 2019.

Pappa et al., "Neural Network Based Predictor for Control of Cascaded Thermal Process," Proceedings of IEEE International Conference on Intelligent Sensing and Information Processing, pp. 289-294, year 2004.

Ellis et al., "Matchstick: A Room-to-Room Thermal Model for Predicting Indoor Temperature from Wireless Sensor Data", Proceedings of the 12th International ACM Conference on Information Processing in Sensor Networks (IPSN'13), pp. 31-42, year 2013.

EP Application # 18903231.1 Search Report dated Oct. 18, 2021.

* cited by examiner

CONTROLLER TRAINING BASED ON HISTORICAL DATA

FIELD OF THE INVENTION

The present invention relates generally to process control and particularly to methods of generating a controller based on a system model.

BACKGROUND OF THE INVENTION

Industrial processes require specific physical conditions which are to be kept at predetermined values defined based on safety and regulation constraints as well as economic considerations. Maintaining the system at these predetermined values, under conditions which may vibrate and/or fluctuate, is a demanding task. For example, to operate at its economic optimum, an industrial process may require specific values of pressure, temperature and/or chemical quantities (e.g., molecular composition at one or more physical locations). In order to meet the required conditions, a controller is employed.

A control process governed by a controller involves various variables conventionally classified into three groups:
1) Controlled variables, also referred to as output variables, are the variables which the controller attempts to steer
2) Manipulated variables, also referred to as input variables, are variables that affect the values of the controlled variables, and which the controller can manipulate in order to achieve the desired goals defined for the controlled variables, and
3) Disturbance variables, also referred to as "load", are variables whose values affect the controlled variables, but the controller cannot manipulate them.

In many processes, the connection between the manipulated and/or disturbance variables and the controlled variables is complex, and programming a controller is a long and expensive task, requiring substantial human expert involvement. One class of methods for planning a controller for an industrial plant is referred to as model predictive control (MPC).

U.S. Pat. No. 8,296,107 to Turner et al., the disclosure of which is incorporated herein by reference, describes a constrained non-linear approximator for empirical process control.

U.S. Pat. No. 6,185,470 to Pado et al., the disclosure of which is incorporated herein by reference, describes a system for controlling a dynamic nonlinear plant, which uses a neural network to predict a set of future states of the plant.

U.S. Pat. No. 6,882,992 to Werbos, the disclosure of which is incorporated herein by reference, describes an adaptive control method which uses a predictor to predict performance over N future time periods for maximizing a utility function over N time periods rather than only a single time period. The predictor allows calculation of a derivative which is used in adjusting the controller.

Various papers relate to offline evaluation of control policies.

A paper by Philip Thomas and Emma Brunskill, titled: "Data-Efficient Off-Policy Policy Evaluation for Reinforcement Learning", describes a method of predicting the performance of a reinforcement learning policy given historical data that may have been generated by a different policy.

A paper by Philip Thomas et al., titled: "High Confidence Off-Policy Evaluation", describes a procedure for estimating accuracy of methods that evaluate a policy without requiring its execution.

A paper by Raphael Fontaneau et al., titled: "Model-Free Monte Carlo-like Policy Evaluation", describes an algorithm for estimating the performance of a control policy by replaying historical sequences generated with a different policy.

A paper by Shayan Doroudi et al., titled "Robust Evaluation Matrix, Towards a More Principled Offline Exploration of Instructional Policies", proposes a method for evaluating different teaching policies by running them on different student simulators.

A paper by Travis Mandel et al., titled "Offline evaluation of Online Reinforcement Learning Algorithms", describes methods to replay historical sequences for offline evaluation of reinforcement learning algorithms.

SUMMARY

There is provided in accordance with an embodiment of the present invention, a method of generating a controller for a continuous process, including receiving from a storage memory, off-line stored values of one or more controlled variables and one or more manipulated variables of the continuous process over a plurality of time points, training a first neural network to operate as a predictor of the controlled variables responsive to the received stored values, training a second neural network to operate as a controller of the continuous process using the first neural network after it was trained to operate as the predictor for the continuous process and employing the second neural network as a controller of the continuous process.

Optionally, at least 99% of the data used in training the second neural network to operate as a controller is off-line data not received from the continuous process during the training. Optionally, at least 90% or event at least 99% of the data used in training the first neural network to operate as a predictor is off-line data not received from the continuous process during the training.

Optionally, training the first and second neural networks is performed without using knowledge about a policy of a controller of the continuous process when the off-line stored values were generated. Optionally, the method includes testing an accuracy of the predictor using the stored values at a sub-group of the plurality of time points, and wherein the training of the second neural network to operate as a controller begins only after the accuracy of the predictor is determined to be above a predefined threshold.

Optionally, training the second neural network to operate as a controller comprises performing a plurality of training episodes, each training episode including interchangeably applying the predictor and a current state of the second neural network to a training scenario for a plurality of iterations, and adjusting the second neural network according to an evaluation of the values of the controlled variables generated by the predictor during the training episode. Optionally, adjusting the second neural network according to an evaluation of the values of the controlled variables generated by the predictor during the training episode comprises calculating a reward function which depends on values of the controlled variables during the training episode and values of target variables. Optionally, the reward function comprises a difference between the values of the controlled variables generated by the predictor during the training episode and values of corresponding target variables. In some embodiments, the reward function additionally depends on values of one or more of the manipulated variables during the training episode.

In some embodiments, calculating the reward function comprises calculating an extent to which one or more of the controlled variables or manipulated variables exceed an upper or lower bound specified by the target variables. In some embodiments, the values of the target variables in the reward function vary over time within operator-specified ranges. Optionally, calculating the reward function comprises calculating the extent to which one or more of the controlled variables or manipulated variables exceed an upper or lower bound specified by a target value. Alternatively or additionally, calculating the reward function comprises calculating a function which depends on one or more of a market price of a product produced by the continuous process and a cost of one or more inputs of the continuous process. Optionally, calculating the reward function comprises calculating a sum of two or more terms, each weighted by a different target variable.

Optionally, the first neural network comprises a plurality of independent neural networks, each trained to predict a different set of one or more of the controlled variables. Optionally, the first neural network outputs probabilistic distributions of values for one or more of the controlled variables. Optionally, the predictor neural network is trained to operate when one or more of its inputs may be missing. Optionally, the method includes calculating values of one or more virtual controlled variables at least for a sub-group of the plurality of time points, from the received off-line stored values of one or more of the controlled and manipulated variables, and wherein training the first neural network comprises training the first neural network to operate as a predictor also for the virtual controlled variables, based on the received storage values and the calculated values.

In some embodiments, calculating values of the one or more virtual controlled variables comprises calculating by a neural network trained to predict values of the one or more variables from the received off-line stored values, wherein the neural network is trained using values at time points for which actual readings for the one or more variables are available.

In some embodiments, the method includes calculating values of one or more virtual controlled variables at least for a sub-group of the plurality of time points, by interpolation from received values of the one or more virtual controlled variables for other time points, and wherein training the first neural network comprises training the first neural network to operate as a predictor also for the virtual controlled variables, based on the received storage values and the calculated values.

Optionally, receiving the stored values comprises receiving values of one or more disturbance variables, and wherein training the first neural network comprises training based on the received stored values, including the values of the one or more disturbance variables. Optionally, training the first neural network comprises for each of a plurality of time points providing the first neural network an input vector, and adjusting the first neural network according to a difference between an output of the first neural network and an expected output vector for the provided input vector.

Optionally, training the first neural network comprises providing the first neural network with input vectors for a sequence of a plurality of consecutive time points, in which each input vector is adjusted according to an output of the first neural network from a previous time point, and adjusting the first neural network only based on the output from the first neural network at an end of the sequence of consecutive time points.

Optionally, training the first neural network comprises providing the first neural network with input vectors for a sequence of a plurality of consecutive time points, in which each input vector is adjusted according to an output of the first neural network from a previous time point, and adjusting the first neural network only after the end of the sequence of consecutive time points. Optionally, training the first neural network comprises training a plurality of first neural networks to serve as predictors for different variables of the continuous process, and wherein training the second neural network to operate as a controller comprises training using prediction values from the plurality of first neural networks trained to operate as predictors.

There is further provided in accordance with an embodiment of the present invention, a method of controlling a continuous process, comprising operating a continuous process under control of a controller, during the operation of the continuous process, monitoring a value of a controlled variable of the continuous process, during the operation of the continuous process, at a given current time point, operating a predictor, which estimates a value of the controlled variable at a future time point, a plurality of time points ahead of the given current time point, by initializing a prediction state with a state of the continuous process at the given current time point, interchangeably performing for the time points from the given current time point to the future time point: operating the predictor on the prediction state to estimate a value of the controlled variable in a next time point; and applying the controller to the prediction state including the values of the controlled variable in the next time point, from the predictor, to update the prediction state, and displaying a graph of the monitored value of the controlled variable along with the estimates of the value of the controlled variable from the predictor.

Optionally, displaying the graph comprises displaying a first graph, of the monitored values of the controlled variable at a plurality of past time points, along with a second graph of predictions of the values of the controlled variable at the plurality of past time points, wherein the predictions were made at least a predefined number of time points in advance. Optionally, displaying the graph comprises displaying a graph of the monitored values of the controlled variable at a plurality of past time points along with predictions of values of the controlled variable for a plurality of future time points. Optionally, the future time point is at least 10 time points ahead of the given current time point. Optionally, the method includes receiving a test value of at least one variable and wherein the estimate of the value of the controlled variable at the future time point is calculated for the received test value instead of the value of the at least one variable at the given current time point.

Optionally, the controller controls one or more manipulated variables, wherein the controller is configured with one or more hard rules defining values which may be assumed by the one or more manipulated variables and with one or more soft rules defining values which may be assigned to the one or more manipulated variables by the controller, and wherein applying the controller to the prediction state is performed without regarding the soft rules. Optionally, the method includes displaying an indication of an operation of the continuous process if the soft rules are ignored, relative to an actual operation of the continuous process. Optionally, the method includes displaying an indication of an extent to which the predictor predicted the value of the controlled variable, over a plurality of time points. Optionally, the method includes displaying a graphical user display feature showing a connection between controlled variables of the continuous process and an extent to which the controlled variables meet constraints defined for them over a recent time period. Optionally, displaying the graphical user display feature comprises displaying a histogram which shows for a plurality of ranges of extents of meeting constraints respective percentages of variables of the controller that meet their constraints to that extent. Optionally, the method includes displaying graphs of values for the variables of the controller that meet their constraints to an extent within a specific range, responsive to an actuation of a bar of the histogram corresponding to the specific range.

There is further provided in accordance with an embodiment of the present invention, an apparatus for generating a controller for a continuous process, comprising an input interface configured to receive from a storage memory, off-line stored values of one or more controlled variables and one or more manipulated variables of the continuous process over a plurality of time points; and a processor configured to train a first neural network to operate as a predictor of the controlled variables responsive to the received stored values, to train a second neural network to operate as a controller of the continuous process using the first neural network after it was trained to operate as the predictor for the continuous process and to employ the second neural network as a controller of the continuous process.

The present invention will be more fully understood from the following detailed description of the embodiments thereof, taken together with the drawings in which:

DETAILED DESCRIPTION OF EMBODIMENTS

An aspect of some embodiments of the invention relates to a method of generating a controller for a continuous process, such as a production process in an industrial plant, based on historical data collected from the industrial plant. The method includes training a predictor by supervised learning, for example training a first neural network, using historical data, to serve as a predictor of the plant state. Thereafter, the predictor is used to train a controller, by supervised learning, to maximize utility, for example by training a second neural network that will serve as a controller for the industrial plant.

System Overview

Figure 1:
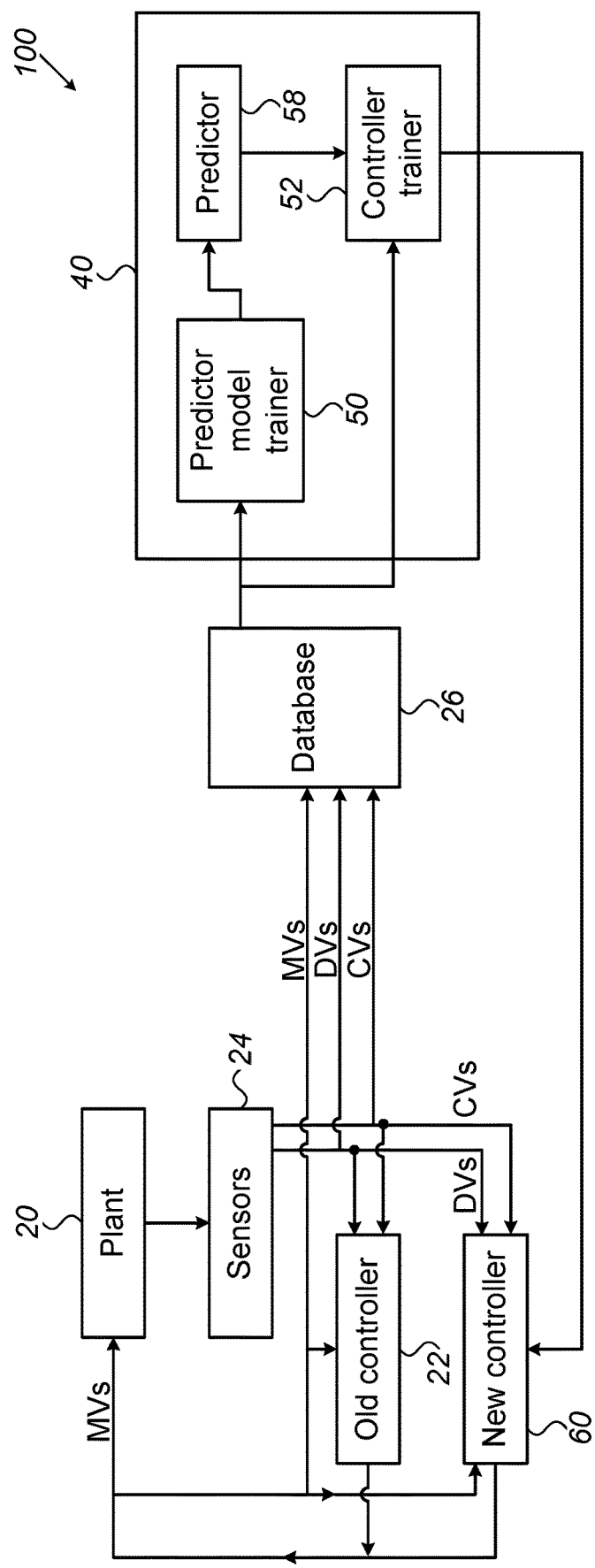
FIG. 1 is a schematic block diagram of a system for training a controller for a controlled plant, in accordance with an embodiment of the invention.

FIG. 1 is a schematic block diagram of a system 100 for training a new controller 60 for a controlled plant 20, in accordance with an embodiment of the invention. As is known in the art, controlled plant 20 is controlled by one or more manipulated variables (MVs) provided by an old controller 22. Old controller 22 receives readings of controlled variables (CVs) and disturbance variables (DVs) from one or more sensors 24. Based on the received readings, and possibly on previous readings, and/or on previous values of manipulated variables (MVs), old controller 22 provides current values for the manipulated variables, which are provided to the controlled plant 20. In addition, the readings of the controlled variables (CVs) and disturbance variables (DVs), as well as the manipulated variables (MVs) are fed to a database 26, for archiving. New controller 60 is intended to replace old controller 22, which may use any control method known in the art, including direct or indirect human control, and/or various known legacy methods. The present method for generating new controller 60 is optionally independent of controller 22, not relying on any of its details.

In some embodiments, a computing system 40 uses the values stored in database 26, to train a new controller 60, which is to replace old controller 22. Computing system 40 optionally includes a predictor model trainer 50, which generates a predictor 58 that models controlled plant 20, using the values stored in database 26. In addition, computing system 40 comprises a controller trainer 52, which trains a controller to be implemented as new controller 60, based on predictor 58 and the values stored in database 26.

In some embodiments, predictor model trainer 50 and/or controller trainer 52 perform the entire training of predictor 58 and/or new controller 60, respectively, without using real time on-line information from the controlled plant 20. The training of predictor 58 and/or new controller 60 is optionally performed without knowledge of the policy implemented by old controller 22. Optionally, the training of predictor 58 is performed based entirely on off-line historical data stored in database 26. Possibly, at least 80%, at least 90% or even at least 99% of the data used in training predictor 58 is data collected from plant 20 and/or stored in database 26 at least a day or even at least a week or a month before the training begins.

Predictor model trainer 50 and controller trainer 52 are optionally implemented in software on one or more computers of computing system 40. Predictor model trainer 50 and/or controller trainer 52 may be provided in a local computing network, as a cloud service, as a backend server or in any other suitable processing arrangement. Predictor model trainer 50 and controller trainer 52 may be implemented together on the same one or more processors, or may each be implemented on different processors of computing system 40. The software for implementing predictor model trainer 50 and/or controller trainer 52 may be downloaded to computing system 40 in electronic form, over a network, for example. Additionally or alternatively, the software may be stored on tangible, non-transitory computer-readable media, such as optical, magnetic, or electronic memory media. Further alternatively or additionally, computing system 40 may comprise a special-purpose computer and/or hardware logic that is programmed or otherwise designed to carry out some or all of the functions of predictor model trainer 50 and/or controller trainer 52.

The values stored in database 26 include values of manipulated variables (MVs), disturbance variables (DVs) and controlled variables (CVs) of controlled plant 20, from a plurality of time points. The specific variables for which values are stored depend on the specific plant 20. For example, for a distillation column, required to meet at least a minimal product quality, the manipulated variables may include a temperature setting at a top temperature setpoint, a temperature setting at a reboiler temperature setpoint and a pressure setting at a top pressure setpoint. The disturbance variables include, for example, a flow rate and/or temperature of feedstock entering plant 20, and the controlled variables include one or more measures of the product quality.

In some embodiments, one or more of the controlled variables (CVs) are not provided by actual sensors, but rather are virtual controlled variables which are calculated from one or more other controlled, disturbance and/or manipulated variables and/or from one or more other sensor readings. Optionally, the virtual controlled variables are linear or non-linear functions of one or more other variables or sensor readings.

The controlled variables may also include one or more virtual controlled variables that represent a signal sampled at a low rate, for example, lower than once every 10, 50, 100 or 1000 time points in which regular controlled variables are measured. Optionally, the values at the intermediate time points are estimated by interpolation from the values at the measured time points. Alternatively or additionally, machine learning is applied to the values of the controlled variables and possibly the manipulated and/or disturbance variables at the time points at which the low-rate sampled variables were sampled, to determine a connection between the other controlled, disturbance and/or manipulated variables and the low-rate sampled variables. A resultant function is then applied to the values of the controlled, disturbance and/or manipulated variables at the time points for which the low-rate sampled variable was not measured to provide inferred values for these times of the low-rate sampled variables. Alternatively to the low-rate sampled variables being calculated as a function of the other variables at a single time point, the values of the low-rate sampled variables are calculated based on values of the other variables in a plurality of time points in the vicinity of the time point for which the values of the low-rate sampled variables are calculated. For example, a machine learning device is optionally trained to predict low-rate sampled variable values at each given time point, based on 10-20 time points before and/or after the given time point. In some embodiments, the values of the low-rate sampled variables are inferred via a combination of interpolation from the sampled values and the resultant function from the machine learning.

The time points for which values are stored in database 26 optionally include time points separated by regular periods, such as every 5 seconds, 15 seconds, half minute, minute, five minutes or fifteen minutes. The time points for which values are stored in database 26 optionally span over a relatively long period, for example, at least a week, at least a month, at least a year or even at least 3 years or more. In some embodiments, values are collected for at least 1000 time points, for at least 10,000 time points, for at least 100,000 time points or even for at least a million time points. It is noted that if values are collected every fifteen seconds, values for 5760 time points are collected every day, such that in some embodiments, more than 2 million time points per year are collected and considered by computing system 40. In some embodiments, values for time points of at least 1 year, at least 3 years or even at least 5 years are used by computing system 40 in generating predictor 58 and/or new controller 60.

The number of variables having values at each time point may be relatively small, for example less than 10 variables or even less than five variables, or may be very large, for example more than 50 variables, more than 100 variables, more than 1000 variables or even more than 10,000 variables.

Neural Networks

In some embodiments, predictor model trainer 50 and controller trainer 52 operate by training a neural network. Following is a short discussion of a neural network which may be used by trainers 50 and/or 52. It is noted that other deep learning models, including other neural networks, may be used, such as any of the suitable neural networks described in the book "Deep Learning", by Goodfellow, et al., available from http://www.deeplearningbook.org/, the disclosure of which is incorporated herein by reference in its entirety. For example, model architectures that may be used include but are not limited to:

Convolutional Neural Networks (CNN) of arbitrary depth with/without pooling layers, dilations, residual layers, dense layers and/or batch normalization layers;

Recurrent Neural Networks (RNN) of arbitrary depth with/without Long Short Term Memory (LSTM) cells and/or bi-directional LSTM cells and/or Gated Recurrent Unit (GRU) cells;

Restricted Boltzmann Machines (RBM);

Generative Adversarial Networks (GAN);

Auto-Encoders (AE) or Variational Auto-Encoders (VAE); and probabilistic graphical models such as Hidden Markov Models (HMM) or Latent Tree Models (LTM).

The neural network is optionally arranged as a series of n+1 layers. A first layer $h_1=f_1(W_1x+b_1)$ connects a vector x of input values, to a first intermediary vector $h_1$, by multiplying the input vector x by a matrix $W_1$, adding a bias vector $b_1$, and applying an activation function $f_1$ to the result $W_1x+b_1$. Subsequent layers connect further intermediary vectors $h_2, h_3, \ldots h_n$ to their previous intermediary vector $h_1, h_2, h_3, \ldots h_{n-1}$, by corresponding weight arrays $W_2, W_3, \ldots W_n$, bias vectors $b_2, b_3, \ldots b_n$, and activation functions $f_2, f_3, \ldots f_n$. This may be represented as $h_{i+1}=f_{i+1}(W_{i+1}h_i+b_{i+1})$ for $1 \leq i \leq n-1$. A final layer $y=f_{n+1}(W_{n+1}h_n+b_{n+1})$ connects the last intermediary vector $h_n$ to an output vector y, through a weight array $W_{n+1}$, a bias vector $b_{n+1}$ and an activation function $f_{n+1}$. The activation functions $f_1, f_2, f_3, \ldots f_{n+1}$ may all be the same function, or different functions may be used for different layers. In some embodiments, the activation functions comprise a pointwise non-linear function, such as a Rectified Linear Unit (ReLU) function which changes all negative values of its input vector to zero, without changing positive input values. In other embodiments, the activation function comprises a tanh function, a sigmoid function or a leaky ReLU function.

It is noted, that in some embodiments, the final function $f_{n+1}$ is a linear function, possibly the identity function. It is also noted that in some cases the bias vectors $b_1, b_2, b_3, \ldots b_{n+1}$ are not used, or, stated otherwise, are kept at zero.

The sizes of the intermediary vectors $h_1, h_2, h_3, \ldots h_n$ may be any suitable sizes known in the art to be useful. Optionally, the sizes (i.e., number of elements in the vector) of the intermediary vectors $h_1, h_2, h_3, \ldots h_n$ are powers of 2, e.g., 32, 64, 128 or 256, in order to simplify the computer operations.

The training of the neural network includes feeding the neural network with input data, and adjusting the values of the elements of the weight arrays $W_1, W_2, \ldots W_{n+1}$ and bias vectors $b_1, b_2, b_3, \ldots b_{n+1}$ so that the output vector y of the neural network is closer to the required output vector for the input data. This is repeated many times until the neural network is properly trained.

Predictor Model Trainer

Predictor model trainer 50 optionally comprises a neural network which is adjusted to match the variable values stored in database 26. Optionally, the neural network is trained to provide for each time point t, the values of the controlled variables (CVs) of time t+1, given a predetermined number of values of the controlled variables, manipulated variables and/or disturbance variables of the time points up to t. Optionally, the controlled variables of time t+1 are a function of the controlled variables, manipulated variables and disturbance variables of time points t-T . . . t, i.e., of a period of T time points before the calculated time point. In some embodiments, the neural network is trained to support missing values using any of the suitable methods known in the art. Optionally, some or all of the variables are assigned an out-of-range value to signify that the value of the variable at the specific time point is missing. Predictor model trainer 50 trains the neural network with various scenarios which include the missing value indicator, such that the neural network can provide a fair response even when some variable values are missing. This allows prediction even in scenarios where values for some or all of the controlled, manipulated and/or disturbance variables are missing, at some or all of the time points t-T . . . t. It is noted that in some embodiments, missing values may result from malfunctions in sensors, whereas in others, they may result from the complete removal of variables from plant 20, or from a decision to reduce sampling rate, e.g. take measurements every second time point or every fifth time point.

Figure 2:
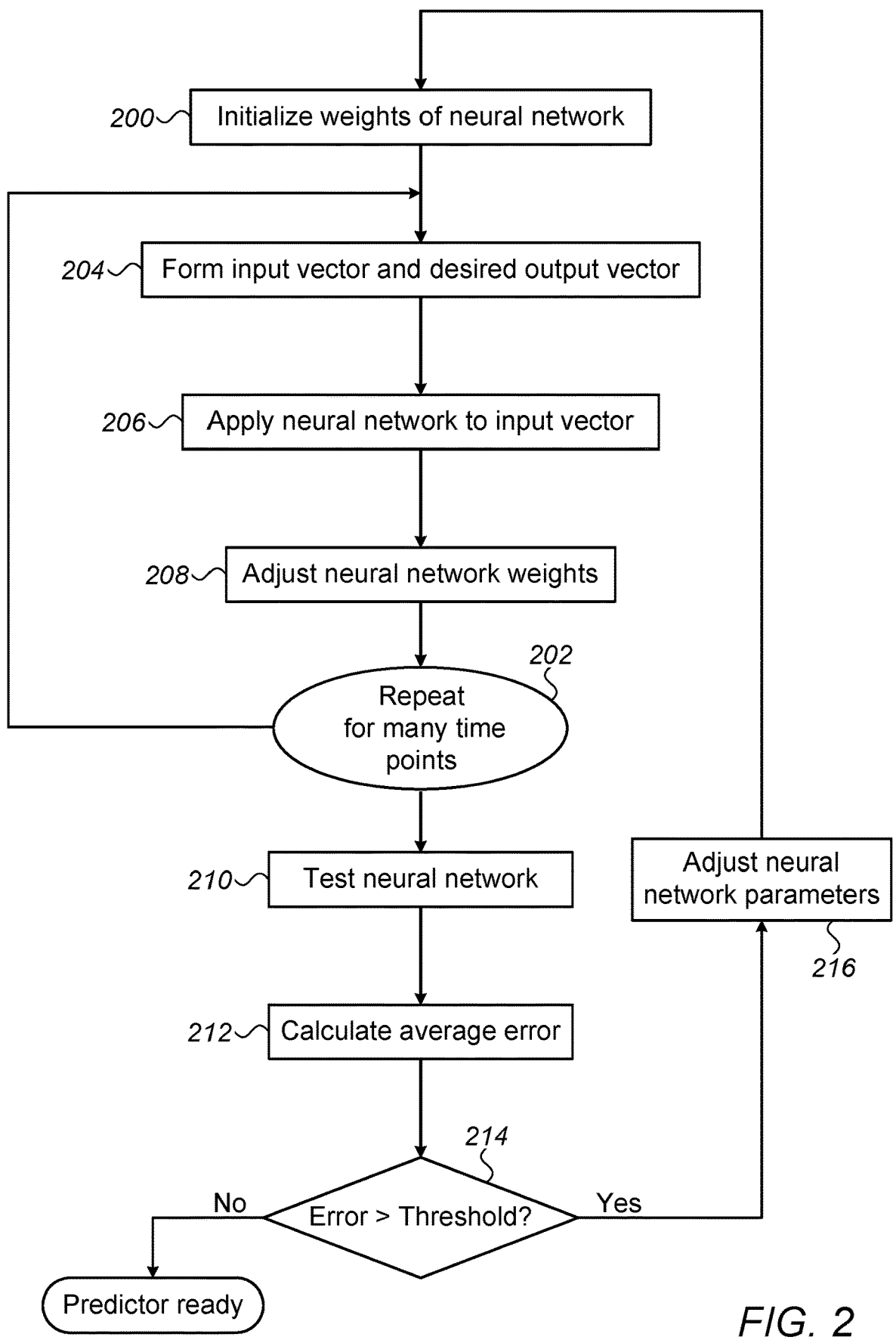
FIG. 2 is a flow chart of acts of a predictor trainer, in accordance with an embodiment of the invention.

FIG. 2 is a flowchart of a method of training a neural network to be predictor 58, by predictor model trainer 50, in accordance with an embodiment of the present invention. The method begins with initializing (200) the weights $W_i$ and/or bias vectors $b_i$ of the neural network. After initialization, for each (202) of a plurality of time points t, an input vector x is formed (204) of values of controlled variables (CVs), manipulated variables (MVs) and/or disturbance variables (DVs) of time points t-T . . . t, and a desired output values vector y' is formed (204) of the values of the controlled variables at time t+1. The neural network is applied (206) to the input vector x and the resultant output vector y is compared to the desired output values vector y'. Based on a difference between the output vector y and the desired output values vector y', the neural network weights are adjusted (208) in a direction which reduces the difference. The magnitude of the difference is calculated using any suitable difference measure, such as absolute value or sum of squares. The forming (204) of the vectors, applying (206) the neural network and adjusting (208) the weights is repeated (202) for many time points, so that predictor 58 reliably models the operation of controlled plant 20.

In some embodiments, the resultant predictor 58 is tested (210) based on data from database 26. The testing is performed in a manner similar to the neural network training, but instead of adjusting the weights of the neural network in response to the comparison of the output vector y and the desired output values vector y', an average error equal to the difference between the vectors y, y' is calculated (212) over a plurality of time points and the average is displayed to a human user and/or is compared to a threshold. If (214) the average difference is smaller than the threshold, the predictor 58 is considered ready for operation. Otherwise, one or more parameters of the neural network are adjusted (216), such as the number of layers, the specific controlled, manipulated and/or disturbance variables used, the size of the intermediary vectors $h_1, h_2, h_3, \ldots h_n$ and/or the duration T of the time period used to form the input vector x. The training of the neural network is then repeated.

The initialization (200) of the neural network may be performed using any suitable method known in the art. In many cases, the results of the neural network after sufficient training do not depend on the initialization values and therefore arbitrary initial values are used. In some embodiments, the initialization values of the weights of the neural network are selected randomly. Optionally, the initialization values are selected to be relatively small, but not zero. Alternatively, the weight matrices of the neural network are initialized to the identity matrix.

As to forming the input vector x, the number of values in input vector x optionally depends on the number of variables involved in the control process. Optionally, the input vector includes values for at least 10 time points, at least 25 time points or even at least 50 time points. In some embodiments, input vector x includes more than 200, more than 500 or even more than 10,000 values.

The adjusting (208) of the neural network weights is optionally performed using any suitable method known in the art, such as a Gradient Descent (GD) method. In some embodiments, the adjusting of the neural network is performed using a Stochastic Gradient Descent (SGD) method or variants thereof, such as the Adam, Momentum or RMSprop methods. Additionally, in some embodiments, the adjusting of the neural network is performed in parallel to a method for preventing overfitting, such as weight decay or dropout, and/or a method for accelerating training, such as batch normalization.

In some embodiments, the training of the neural network to be predictor 58 uses all the available time points having values stored in database 26. In these embodiments, the testing (210) is performed using data already used in the training or is not performed at all. In other embodiments, a certain percentage of the data in database 26 is used for the training, and the remaining data is used for the testing. Optionally, at least 60%, at least 70% or even at least 80% of the time points having data in database 26 are used for the training. The testing is optionally performed based on at least 10% or even at least 20% of the time points having data in database 26.

Alternatively to repeating the training for a predetermined number of iterations, the training is repeated until the difference between the output vector y and the desired output values vector y', over at least a given number of repetitions, is smaller than a small threshold indicating the neural network is properly trained.

As described above, a single neural network is trained for all the controlled variables together. In other embodiments, multiple neural networks are trained to predict the controlled variables, optionally a separate neural network for each of the controlled variables. In some embodiments involving multiple neural networks, the input vector for each neural network is based on a different set of variables and/or a different time period. Additionally or alternatively, one or more of the controlled variables is predicted by a manually determined function reflecting prior knowledge on controlled plant 20, instead of being predicted by a neural network.

Alternatively, the training is performed in any other order, for example, in a random order or an order selected to allow fast extraction of data from the database. In some embodiments the training is performed for segments of time points from different areas of the time points under consideration interchangeably.

In some embodiments, as in the above description, the predictor is applied on values up to time t in order to estimate values of the controlled variables (CVs) at time t+1. In other embodiments, the predictor is applied to a vector including values of manipulated variables (MVs) at time t+1 in predicting the controlled variables (CVs) at time t+1, so as to take into account the most recent values of the manipulated variables (MVs).

Instead of the training based on each time point on its own, in some embodiments the training of predictor 58 is performed on sequences of time points together. For each sequence of time points, $t_1, t_2, \ldots t_n$, the forming (204) of the vectors and applying (206) of the neural network in order to receive the values of the controlled variables, are performed for the first time point of the sequence $t_1$. Then, instead of immediately adjusting the weights of the neural network according to a comparison to a desired output values vector y', an input vector for the second time point $t_2$ is created using the outputs of the predictor instead of the stored values from database 26, for the values of the controlled variables at time $t_1$. This process is repeated until predicted values are calculated for time $t_n$. Then, the predicted values for times $t_1, t_2, \ldots t_n$ are compared to the stored values using a given metric and the neural network is adjusted accordingly.

In some embodiments of the invention, rather than predicting explicit values of controlled variables, predictor 58 is trained, using any suitable method known in the art, to produce a distribution over different possibilities. For example, predictor 58 may output at time point t the mean and covariance of a Gaussian distribution which reflects estimated posterior probabilities of controlled variable values in time point t+1. This allows modelling uncertainty in the behavior of controlled plant 20, to optionally be taken into account by controller trainer 52.

It is noted that although the above description refers to predictor 58 estimating controlled variable values one time point into the future, in some embodiments of the invention the prediction spans several time points into the future. This is optionally used by controller trainer 52 to assess future state of plant 20 in the absence of intermediate actions.

Controller Trainer

Controller trainer 52 optionally trains a neural network to operate as a new controller 60 of plant 20. The resultant controller 60 determines, for a time point t, current action values, i.e., values of the manipulated variables (MVs) at time point t+1. The MVs of time point t+1 are determined as a function of previous values in a period up to time t, of the manipulated variables (MVs), the disturbance variables (DVs), the controlled variables (CVs) and of target variables (TVs) indicating a desired value for each controlled variable (CV). It is noted that in some embodiments, a plurality of target variables (TVs) are defined for a single controlled variable (CV) and the proximity of the value of the controlled variable (CV) to the target values is measured based on the target value to which the value of the CV is closest or based on a proximity to a sub-group of the target values. In some embodiments, instead of target values, target ranges are defined. In some embodiments, as discussed below, a reward function is defined in the controller trainer 52 and this reward function depends on the target values and/or target ranges, in a plurality of different manners, in addition to the dependence of the reward function on the CVs, MVs and/or DVs. While in some embodiments the target variables (TVs) merely define desired values or ranges for the CVs, in other embodiments the connection between the desired values of the CVs and the target variables (TVs) may be more complex.

In some embodiments, one or more of the target variables (TVs) are set to externally-determined values, such as market prices of feedstock, utilities, and end products, and could change at a rate of at least a monthly, weekly, daily or even hourly basis. Alternatively or additionally, one or more of the target variables (TVs) are set to operator-defined values, representing different aspects of the control objective, for example the priority of a particular CV being close to a particular target value. Such operator-defined TVs may change often, for example at least every hour, every 10 minutes, 1 minute, or even every 5 seconds, or may be relatively fixed, changing only rarely or not at all. The overall desired behavior of future CVs based on current TVs and past CVs, MVs, DVs and/or TVs, is determined by a reward function. The reward function may be manually defined, as exemplified below, or it may be estimated via machine learning. For example, historical values of market-related TVs (e.g. feedstock prices or energy costs), along with the historical economic profit of controlled plant 20, may be used, in conjunction with historical CV, MV and/or DV values from database 26, to train a neural network to learn a relation between the TVs, CVs, MVs and/or DVs, and the economic profit. This learned relation may serve as a reward function, estimating an economic profit for trained controller 60 to maximize.

For example, a first target variable (TV) may be set to the revenue received for a product produced by controlled plant 20, a second target variable is set to a cost utilized in the product production (e.g., feedstock, cooling cost, heating cost) and the reward function is defined as a difference between the revenue and costs of plant 20, to represent profit.

Figure 3:
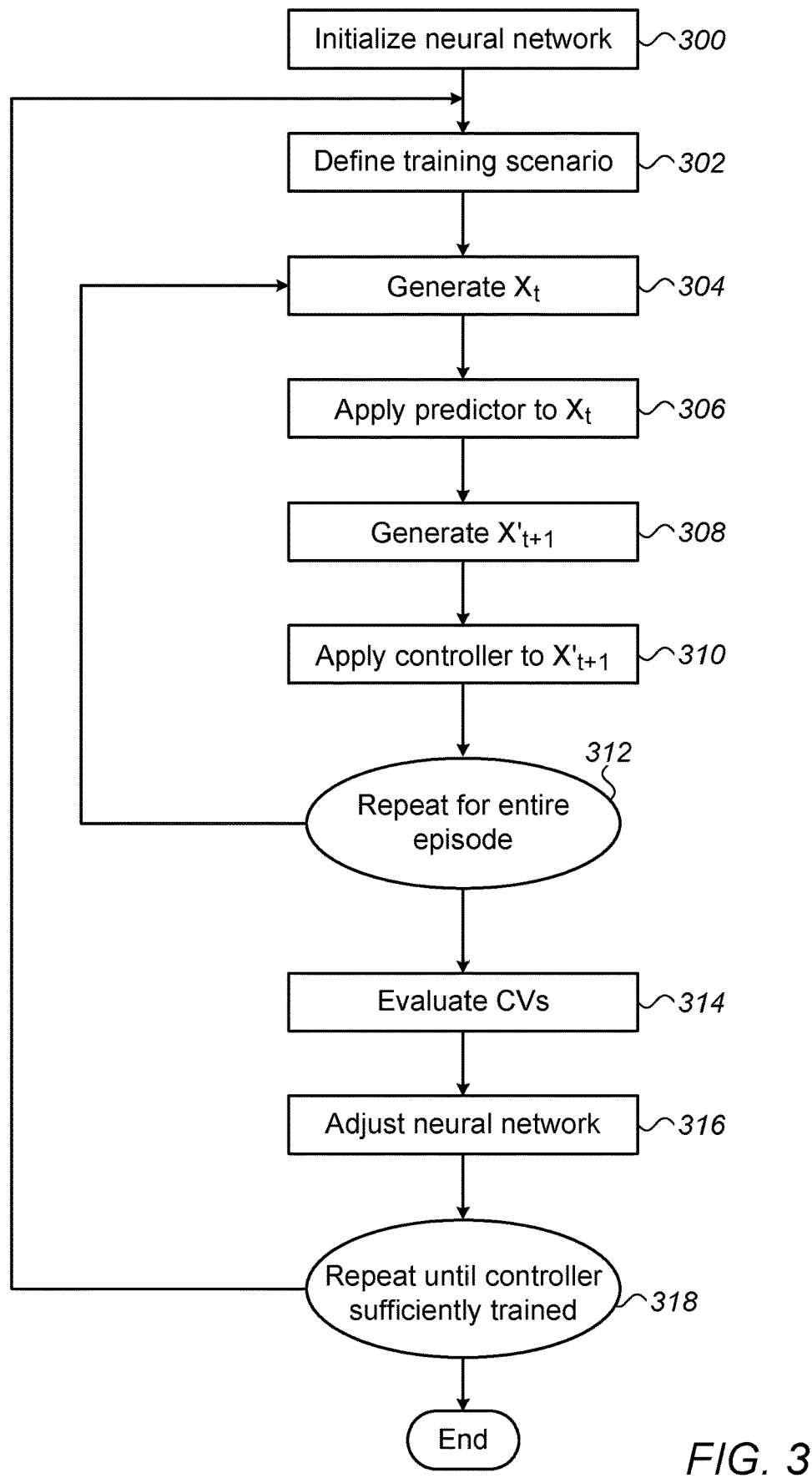
FIG. 3 is a flowchart of acts of a controller trainer, in accordance with an embodiment of the invention.

FIG. 3 is a flowchart of a method for training a neural network to act as controller 60, in accordance with an embodiment of the present invention. The training begins with initializing (300) a neural network that is to be trained to become new controller 60, referred to herein as a controller neural network, to an initial set of weights, using any of the methods discussed above regarding the predictor neural network.

For a current state of the controller neural network, controller trainer 52 defines (302) a training scenario for a training episode, which includes target variables (TVs), a length of the training episode, starting conditions of the training episode including values of the controlled variables (CVs), manipulated variables (MVs) and/or disturbance variables (DVs) up to a start time t of the training episode, and values of the disturbance variables (DVs) for the entire length of the training episode.

An input vector $x_t$ for time t, which includes values of the controlled variables (CVs), manipulated variables (MVs), target variables (TVs) and/or disturbance variables (DVs) from the starting conditions of the training episode, is generated (304). The predictor 58 is applied (306) to the initial vector $x_t$, to calculate values of the controlled variables (CVs) for time t+1. An input vector $x_{t+1}'$ is then generated (308) from most or all of the current values of the input vector $x_t$ and the calculated values of the controlled variables (CVs) for time t+1. The current state of the controller neural network is then applied to the input vector $x_{t+}'$ to provide (310) controller determined values of the manipulated variables (MVs) for time t+1. An updated input vector $x_{t+1}$ including most or all of the current values of the input vector $x_{t+1}'$ concatenated with the values of the manipulated variables (MVs) for time t+1 is then generated (304).

The predictor 58 is then applied (306) to the input vector $x_{t+1}$, nd a new input vector $x_{t+2}'$ is generated (308) and provided (310) to the controller. This process is repeated (312) for a predetermined number of time points, according to the length of the training episode.

The resultant controlled variable (CV) values over the predetermined number of time points are then evaluated (314), based on the reward function, to determine an extent to which the current state of the plant meets control objectives, for example, the extent to which the values of the controlled variables meet the target values. It is noted that in some embodiments the reward function also represents an attempt to have manipulated variables (MVs) meet specified goals or constraints. According to the evaluation, the controller neural network is adjusted (316) responsive to the evaluated extent. The adjustment is optionally performed by repeatedly perturbing network weights (e.g. adding small random noise), re-running the training episode and evaluating (314) the reward, until the reward shows improvement (increases in value). Alternatively or additionally, Gradient Descent (GD) steps are used. Optionally, gradients are estimated numerically, by running the training episode multiple times under small weight changes. Alternatively, gradients are estimated by the chain rule, or through a class of methods known in the art as Policy Gradient (PG), for example Monte-Carlo Policy Gradient (REINFORCE) or Actor-Critic Policy Gradient. It is noted that in embodiments in which predictor 58 outputs a distribution over CV values instead of the values themselves as discussed above, applying the predictor (306) involves random sampling, and a training episode is optionally repeated multiple times to obtain better estimates of reward and/or gradients.

Acts 302-316 are repeated (318) for the updated controller neural network until (318) the controller neural network is considered suitable to serve as new controller 60.

Referring in more detail to defining (302) the training scenario, in some embodiments, the target variables (TVs), are fixed for the entire length of the training episode. Alternatively, in one or more of the training episodes, one or more of the target variables (TVs) has values which vary over the training episode. The length of the training episode optionally includes at least 10, at least 50 or even at least 100 time points. In some embodiments, even longer training episodes, possibly of more than 500 or even more than 1000 time points, are used.

The starting conditions of the training episodes and/or the values of disturbance variables (DVs) throughout the episodes are optionally taken from segments of data in database 26. Alternatively, some or all of the training episodes include starting conditions and/or values of the disturbance variables (DVs), which were designed theoretically for the training. In some embodiments, starting conditions and DV sequences are chosen randomly from a predefined range of possibilities. Alternatively or additionally, target variable (TV) values or sequences are chosen randomly from a predefined range. For example, the value of a TV representing market price of feedstock may be chosen randomly, within bounds that reflect maximal and minimal prices the user believes may take place.

The repeated generation (304, 308) of the input vectors $x_{t+1}$, $x_{t+1}'$ optionally results in the replacement of the oldest values included in the vector $x_t$ by the currently generated values of the controlled variables (CVs) and manipulated variables (MVs), that were generated in the current iteration by predictor 58 and the current state of the controller neural network.

In the above description, the repetitions begin with the predictor being applied (306) to the input vector $x_{t+1}$, and then the controller is applied to the input vector $x_{t+1}$. In other embodiments of the present invention, the repetitions are performed in the opposite order—first the controller is applied to its input vector $x_{t+1}'$ and then the predictor is applied to its input vector $x_{t+1}$.

The evaluation (314) of the extent to which control objectives are met optionally includes applying a reward function to the predictor generated values of the controlled variables (CVs), and any other variables considered by the reward function, throughout the entire training episode or a sub-portion of the time points of the training episode.

The reward function may include, for example, sums of the difference between the values of the controlled variables (CVs) and the target variables (TVs) over the entire episode:

$$R_1(\text{episode}) = -\sum_{k=0}^{n} \|CVs(t+k) - TVs(t+k)\|$$

Alternatively or additionally, the reward function includes a function which evaluates how close the values of the controlled variables (CVs) are to the target variables (TVs) at the end of the episode:

$$R_2(\text{episode}) = -\|CVs(t+n) - TVs(t+n)\|$$

Further alternatively or additionally, the reward function evaluates a maximal extent by which the controlled variables (CVs) and the target variables (TVs) differ, over the entire episode:

$$R_3(\text{episode}) = -\max_{0 \le k \le n} \{0, CVs(t+k) - TVs(t+k)\}$$

While in the above examples the reward function includes terms that depend only on CV and TV values, and in particular only on the differences between them, in other embodiments the reward function also depends on MV and/or DV values. For example, the reward may include a term that penalizes a difference between the values of particular MVs and TVs, or a term that penalizes MV values exceeding certain ranges. In some embodiments, the reward is a sum of several terms, each term depending on values of one or more CVs, MVs, DVs and/or TVs. For instance, a term in the reward can be one of the examples given above, or a function that reflects an economic aspect of the plant 20, e.g. multiplication of a CV quantifying flow of material generated by the plant, and a TV quantifying current market price of that material. In this example, the reward may further take into account the costs of running the plant, e.g. it may include an additional term that multiplies the cost of one unit of heating energy (TV), with an MV representing the number of energy units per hour invested in heating. Controller 60 is trained to maximize the economic profit of plant 20 under current market prices. Optionally, the training of the neural network in controller trainer 52 is performed with training scenarios (episodes) involving a plurality of different selling prices for the outputs of plant 20, and/or a plurality of different costs for the inputs of plant 20, so that controller 60 is trained for a sufficient range of costs and selling prices.

In some embodiments of the invention, each of the variables and/or reward terms is assigned a priority weight and the reward function depends on these weights, which are either fixed or dynamic (provided via TVs).

In one example embodiment, the reward function has the form:

$$R = \Sigma_k [\beta_1(k) \text{term}_1(k) + \beta_2(k) \text{term}_2(k) + \beta_3(k) \text{term}_3(k)]$$

where k is an index of time points in the training episode, $\beta_1$, $\beta_2$, $\beta_3$ are user-determined priority weights (TVs) between 0 and 1 indicating respective importance of the terms.

In one example embodiment, the terms are defined as follows:

$\text{term}_1(k) = -\max\{\text{pressure}(k) - \text{pressure\_bound}(k), 0\}$
$\text{term}_2(k) = -\text{abs}\{\text{quality}(k) - \text{quality\_goal}(k)\}$
$\text{term}_3(k) = \text{product\_flow}(k) * \text{product\_price}(k)$ with pressure being an MV, quality and product_flow being CVs, and pressure_bound, quality_goal and product_price being TVs. It should be understood that the above reward functions are merely examples, and that other functions may be used for the specific terms and/or for the combinations of the terms, including different numbers of terms. More generally, the reward function is not necessarily a sum of product between priorities and terms, but rather may encode any dependence on CVs, MVs, TVs and/or DVs. In some embodiments of the invention, the reward is a function determined via machine learning, as discussed above. In some embodiments, the reward function is a combination of terms, some of which are determined via machine learning, while others are designed manually according to specific knowledge regarding the structure, conditions and/or objectives of controlled plant 20.

The training of the controller neural network is optionally repeated until the reward function, and/or one or more of its terms, have values higher (i.e. closer to zero if the reward terms are negative) than predetermined thresholds for at least a predetermined number of consecutive training episodes. Alternatively, the training is repeated until the reward and/or one or more of its terms have an average value over a predetermined number of episodes higher than predetermined thresholds. Further alternatively, any other suitable condition may be used to determine when the controller neural network is sufficiently trained, for example human inspection and/or comparison to reward values attained by old controller 22 and/or previous versions of new controller 60.

It is noted, that predictor 58 and/or new controller 60 may be updated periodically as additional recent values of the controlled variables (CVs), the manipulated variables (MVs) and the disturbance variables (DVs) are accumulated from plant 20, possibly stored in database 26. Such updates may be performed frequently, such as less than every 4 hours, or even not more than every two hours, or may be performed seldom, for example, less than once every two months or less than once a year.

Controller Graphical User Interface

Figure 4:
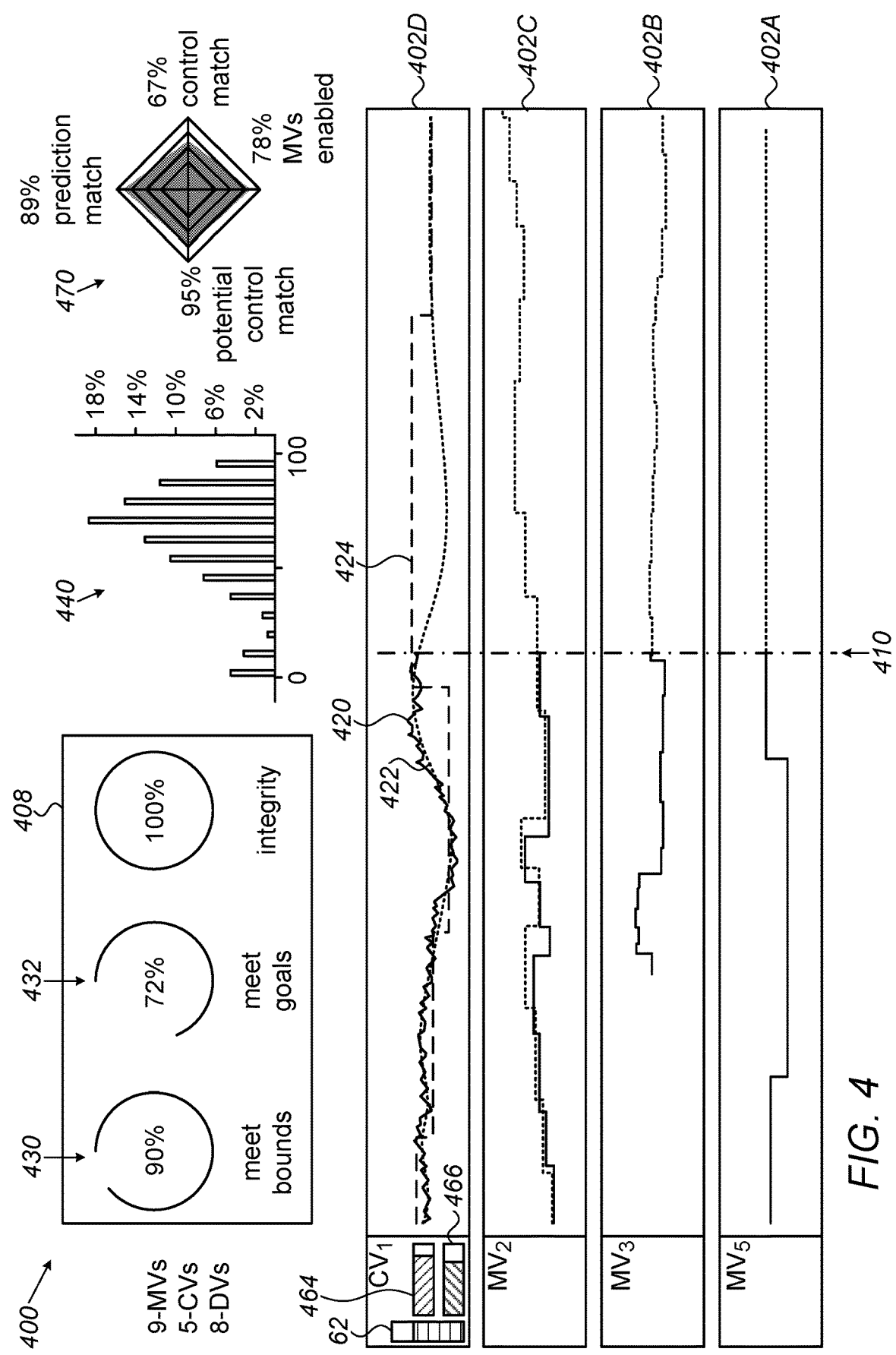
FIG. 4 is a schematic view of a graphical user interface of a controller, in accordance with an embodiment of the invention.

FIG. 4 is a schematic view of a graphical user interface (GUI) 400 of controller 60, in accordance with an embodiment of the invention.

During operation of controller 60 on controlled plant 20, GUI 400 provides visual feedback to the operator. GUI 400 optionally includes a plurality of windows 402A, 402B, 402C and 402D (collectively referred to as 402), each displaying the value over time of one or more of the variables of plant 20. The horizontal axes of the windows 402 represent a time span for display, and a vertical line 410 represents the current time. Signals shown on the right side of line 410 are predictions. Each of windows 402A, 402B, 402C and 402D relates to a specific manipulated variable (MV), controlled variable (CV) or disturbance variable (DV). Optionally, the user may select the variables to be displayed, and possibly also the number of windows 402. Each window 402 shows a graph 420 (solid line) of the value of the respective variable. In addition, as shown in window 402D, a graph 422 (dotted line) of predictions for the value of the variable is optionally provided. The predictions in graph 422 are optionally created by iteratively cascading predictor 58 and controller 60, as described above regarding controller trainer 52. The values displayed in graph 422 are optionally the predicted values generated for each time point, a fixed number of time points (e.g., 16 time points) in advance. The display of the actual signal graph 420 and the prediction graph 422 next to each other allows the user to evaluate the extent to which the signal is predicted reliably. Alternatively or additionally, boundaries and/or target variable (TV) values associated with the displayed variables are also shown. For example, in window 402D, which displays a CV, a dashed line 424 shows a target goal for the CV.

In order to collect the predicted information for the areas to the right of line 410, the predictor 58 and controller 60 are operated repeatedly for a predetermined number of steps, e.g., 15-20 future time points. The user can thus see the expected operation of plant 20 under the control of controller 60 for a near future.

One or more of windows 402 optionally includes bars which indicate an extent to which the signal meets various goals. For example, a bar 62 indicates an extent to which the prediction is close to the actual values, a bar 464 indicates an extent to which the signal meets its bounds and a bar 466 indicates an extent to which the signal meets its goals. GUI 400 also includes, in some embodiments, a window 408 which shows dials of the percentage of signals that meet their goals and/or bounds during a recent number of time points. Alternatively or additionally, window 408 includes one or more dials or other display elements which indicate a percentage of time in which specific variables, or groups of variables, are within desired bounds or meet defined goals. As shown, a dial 430 shows the percentage of signals within the bounds defined for them within a recent time window and a dial 432 shows a percentage of signals that meet goals defined for the signals within a recent time window. The percentages shown in window 408 are optionally calculated as a weighted average of a group of signals of interest, possibly taking into account the extent by which bounds and/or goals are not met. This may be used to ensure, for example, that a signal which exceeds its bounds only slightly will not significantly decrease the displayed percentage. The weights and/or the signals to be included in the weighted average are optionally user adjustable.

A histogram 440, or other graphical user display feature, optionally shows a percentage of signals that meet constraints (e.g. bounds and/or goals) to different extents. The horizontal axis of histogram 440 corresponds to ranges of extents of meeting constraints and the vertical axis corresponds to the percentage of the signals that meet their constraints to a specific extent. In some embodiments, a mouse click or other actuation on one of the bars of the histogram causes windows 402 of the corresponding signals to be displayed.

Optionally, GUI 400 allows a user to override the operation of controller 60 by directly entering a value for one or more of the manipulated variables (MVs). In some embodiments, a user may set upper and lower bounds of one or more MVs. In this case controller 60 is aware of the restriction, and will use MVs which were not overridden to compensate for the lost degree of freedom. Alternatively or additionally, the user may set and/or change the goals and/or bounds of any variables, and the controller 60 adjusts the MVs according to the user set targets. In some embodiments, controller 60 is configured with safety rules which indicate ranges of values of manipulated variables (MVs) from which the controller will not diverge, even if the controller operation indicates values outside the range. For example, a temperature valve may be set to have a safety range of 50-100° C. and even if the controller 60 determines that a higher or lower temperature should be used to achieve a target, the temperature valve will not be set to a value outside the prescribed range. In some embodiments, one or more of bars 62, 464 and 466 is used to indicate an extent to which the safety range was imposed on an attempt to go beyond the safety range.

In some embodiments, controller 60 is configured with hard rules which define permissible values of MVs, and values contradicting the hard rules cannot be used in any event, both by controller 60 and by a human user. In addition, in these embodiments, controller 60 is configured with soft rules, which define permissible values for automatic settings by controller 60. The soft rules limits the values that can be set by the neural network of controller 60, but does not affect operations performed by a human override. Alternatively, the soft rules have the same effect as the hard rules, but are configurable by a lower level of management than the hard rules. For example, the hard rules may be set by engineers setting up plant 20 or by regulators, while the soft rules are set by operators voluntarily for extra caution.

A summary diamond 470 is shown on the top right of GUI 400. The diamond shows for the entire system an extent to which the predictions were close to the actual values, at a top portion. On the bottom portion, the diamond 470 shows an extent to which the soft rules allow controller 60 to use the range of values available according to the hard rules. Alternatively, the bottom portion of diamond 470 indicates a percentage of time in which decisions of controller 60 were not overridden, by the soft rules, hard rules and/or human operator. Optionally, in this alternative, the bottom portion of diamond 470 indicates a percentage of time in which controller 60 sets the values of all the MVs.

On the right, summary diamond 470 shows an extent to which the controlled variables (CVs) meet their goals and/or bounds, while on the left, diamond 470 indicates a potential of controller 60 to bring the controlled variables (CVs) to meet their goals and/or bounds, if the soft rules are removed. This value is optionally calculated by repeatedly applying predictor 58 and controller 60 to an alternative scenario of the operation of plant 20 under the alternative constraints and calculating the extent of meeting the goals and/or bounds in the alternative scenario. Optionally, starting from a specific time point at which the MVs reach a value where they are constrained by the soft rules, a virtual scenario is calculated in parallel to the operation of controller 60 in controlling plant 20. In the virtual scenario, for each time point, controller 60 determines the MV values to be used without the soft constraints and then predictor 58 provides values of the CVs for the provided MV values. This process is repeated for multiple time points, until the MVs in the virtual scenario move back into the limits of the soft rules. The extent to which goals and/or bounds are met during this virtual scenario is optionally used in the calculation of the potential control match shown on the left of diamond 470.

It is noted that a similar process using the predictor 58 and controller 60 may be used to check other hypothetical scenarios, such as adverse values of disturbance variables (DVs), and/or various behaviors of target goals and/or bounds. In some embodiments, this process may be used to simulate the operation of plant 20 under different raw material costs, energy costs and/or product selling prices. Alternatively or additionally, the process may be used for simulating the effect of overriding different subgroups of MVs by a human operator.

Conclusion

While the above description concentrates on embodiments in which a single predictor and a single controller are trained to operate together, in other embodiments a single controller is trained to operate with a plurality of predictors or a plurality of controllers are trained to operate with a single predictor. For example, in a plant including a plurality of units, predictor model trainer 50 optionally trains a separate predictor for each one of the plurality of units, but a single controller is trained by controller trainer 52, for all the units together. In training the controller, controller trainer 52 uses the outputs of all the predictors. This allows a simpler training of the predictors, while achieving a combined controller for all the units. In still other embodiments, a plurality of controllers are trained with outputs from a plurality of predictors, each controller receiving a sub-group of prediction values from one or more of the predictors and outputting a sub-group of manipulated variables.

It will be appreciated that the above described methods and apparatus are to be interpreted as including apparatus for carrying out the methods and methods of using the apparatus. It should be understood that features and/or steps described with respect to one embodiment may sometimes be used with other embodiments and that not all embodiments of the invention have all of the features and/or steps shown in a particular figure or described with respect to one of the specific embodiments. Tasks are not necessarily performed in the exact order described.

It is noted that some of the above described embodiments may include structure, acts or details of structures and acts that may not be essential to the invention and which are described as examples. Structure and acts described herein are replaceable by equivalents which perform the same function, even if the structure or acts are different, as known in the art. The embodiments described above are cited by way of example, and the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art. Therefore, the scope of the invention is limited only by the elements and limitations as used in the claims, wherein the terms "comprise," "include," "have" and their conjugates, shall mean, when used in the claims, "including but not necessarily limited to."

The invention claimed is:

1. A method of generating a controller for a continuous process, comprising:
receiving from a storage memory, off-line stored values of one or more controlled variables and one or more manipulated variables of the continuous process over a plurality of time points;
training a first neural network to operate as a predictor of the controlled variables of the continuous process responsive to the received stored values;

training a second neural network to operate as a controller of the continuous process using the first neural network after it was trained to operate as the predictor for the controlled variables of the continuous process, wherein training the second neural network comprises performing a plurality of training episodes, each training episode including:

generating initial values of variables for a training scenario of the continuous process, repeatedly applying the predictor and a current state of the second neural network to the variables of the training scenario, for a plurality of iterations, and adjusting the second neural network according to an evaluation of the values of the controlled variables generated by the predictor during the training episode; and employing the second neural network as a controller of the continuous process.

2. The method of claim 1, wherein at least 99% of the data used in training the second neural network to operate as a controller is off-line data not received from the continuous process during the training.

3. The method of claim 1, wherein at least 90% of the data used in training the first neural network to operate as a predictor is off-line data not received from the continuous process during the training.

4. The method of claim 3, wherein at least 99% of the data used in training the first neural network to operate as a predictor is off-line data not received from the continuous process during the training.

5. The method of claim 1, wherein training the first and second neural networks is performed without using knowledge about a policy of a controller of the continuous process when the off-line stored values were generated.

6. The method of claim 1, comprising testing an accuracy of the predictor using the stored values at a sub-group of the plurality of time points, and wherein the training of the second neural network to operate as a controller begins only after the accuracy of the predictor is determined to be above a predefined threshold.

7. The method of claim 1, wherein adjusting the second neural network according to an evaluation of the values of the controlled variables generated by the predictor during the training episode comprises calculating a reward function which depends on values of the controlled variables during the training episode and values of target variables.

8. The method of claim 7, wherein the reward function comprises a difference between the values of the controlled variables generated by the predictor during the training episode and values of corresponding target variables.

9. The method of claim 7, wherein the reward function additionally depends on values of one or more of the manipulated variables during the training episode.

10. The method of claim 7, wherein calculating the reward function comprises calculating an extent to which one or more of the controlled variables or manipulated variables exceed an upper or lower bound specified by the target variables.

11. The method of claim 7, wherein the values of the target variables in the reward function vary over time within operator-specified ranges.

12. The method of claim 11, wherein calculating the reward function comprises calculating the extent to which one or more of the controlled variables or manipulated variables exceed an upper or lower bound specified by a target value.

13. The method of claim 7, wherein calculating the reward function comprises calculating a function which depends on one or more of a market price of a product produced by the continuous process and a cost of one or more inputs of the continuous process.

14. The method of claim 7, wherein calculating the reward function comprises calculating a sum of two or more terms, each weighted by a different target variable.

15. The method of claim 1, wherein the first neural network comprises a plurality of independent neural networks, each trained to predict a different set of one or more of the controlled variables.

16. The method of claim 1, wherein the first neural network outputs probabilistic distributions of values for one or more of the controlled variables.

17. The method of claim 1, wherein the predictor neural network is trained to operate when one or more of its inputs may be missing.

18. The method of claim 1, comprising calculating values of one or more virtual controlled variables at least for a sub-group of the plurality of time points, from the received off-line stored values of one or more of the controlled and manipulated variables, and wherein training the first neural network comprises training the first neural network to operate as a predictor also for the virtual controlled variables, based on the received storage values and the calculated values.

19. The method of claim 18, wherein calculating values of the one or more virtual controlled variables comprises calculating by a neural network trained to predict values of the one or more variables from the received off-line stored values, wherein the neural network is trained using values at time points for which actual readings for the one or more variables are available.

20. The method of claim 1, comprising calculating values of one or more virtual controlled variables at least for a sub-group of the plurality of time points, by interpolation from received values of the one or more virtual controlled variables for other time points, and wherein training the first neural network comprises training the first neural network to operate as a predictor also for the virtual controlled variables, based on the received storage values and the calculated values.

21. The method of claim 1, wherein receiving the stored values comprises receiving values of one or more disturbance variables, and wherein training the first neural network comprises training based on the received stored values, including the values of the one or more disturbance variables.

22. The method of claim 1, wherein training the first neural network comprises for each of a plurality of time points providing the first neural network an input vector, and adjusting the first neural network according to a difference between an output of the first neural network and an expected output vector for the provided input vector.

23. The method of claim 1, wherein training the first neural network comprises providing the first neural network with input vectors for a sequence of a plurality of consecutive time points, in which each input vector is adjusted according to an output of the first neural network from a previous time point, and adjusting the first neural network only based on the output from the first neural network at an end of the sequence of consecutive time points.

24. The method of claim 1, wherein training the first neural network comprises providing the first neural network with input vectors for a sequence of a plurality of consecutive time points, in which each input vector is adjusted according to an output of the first neural network from a previous time point, and adjusting the first neural network only after the end of the sequence of consecutive time points.

25. The method of claim 1, wherein training the first neural network comprises training a plurality of first neural networks to serve as predictors for different variables of the continuous process, and wherein training the second neural network to operate as a controller comprises training using prediction values from the plurality of first neural networks trained to operate as predictors.

26. Apparatus for generating a controller for a continuous process, comprising:
   an input interface configured to receive from a storage memory, off-line stored values of one or more controlled variables and one or more manipulated variables of the continuous process over a plurality of time points; and
   a processor configured to train a first neural network to operate as a predictor of the controlled variables of the continuous process responsive to the received stored values, to train a second neural network to operate as a controller of the continuous process using the first neural network after it was trained to operate as the predictor for the controlled variables of the continuous process and to employ the second neural network as a controller of the continuous process,
   wherein the second neural network is trained by performing a plurality of training episodes, each training episode including:
      generating initial values of variables for a training scenario of the continuous process,
      repeatedly applying the predictor and a current state of the second neural network to the variables of the training scenario, for a plurality of iterations, and
      adjusting the second neural network according to an evaluation of the values of the controlled variables generated by the predictor during the training episode.

27. The apparatus of claim 26, wherein the processor is configured to train the first neural network by providing the first neural network with input vectors for a sequence of a plurality of consecutive time points, in which each input vector is adjusted according to an output of the first neural network from a previous time point, and wherein the processor is configured to adjust the first neural network only based on the output from the first neural network at an end of the sequence of consecutive time points.

28. The apparatus of claim 26, wherein the processor is configured to train the first neural network by providing the first neural network with input vectors for a sequence of a plurality of consecutive time points, in which each input vector is adjusted according to an output of the first neural network from a previous time point, and wherein the processor is configured to adjust the first neural network only after the end of the sequence of consecutive time points.

* * * * *